(12) United States Patent
Omura et al.

(10) Patent No.: US 9,157,770 B2
(45) Date of Patent: Oct. 13, 2015

(54) ENCODER

(75) Inventors: Yoichi Omura, Tokyo (JP); Kosuke Shamoto, Tokyo (JP); Takashi Okamuro, Tokyo (JP); Noriyasu Hasegawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 135 days.

(21) Appl. No.: 14/119,236

(22) PCT Filed: Jul. 29, 2011

(86) PCT No.: PCT/JP2011/067490
§ 371 (c)(1),
(2), (4) Date: Nov. 21, 2013

(87) PCT Pub. No.: WO2013/018168
PCT Pub. Date: Feb. 7, 2013

(65) Prior Publication Data
US 2014/0091213 A1   Apr. 3, 2014

(51) Int. Cl.
*G01D 5/347* (2006.01)
*G01D 5/244* (2006.01)

(52) U.S. Cl.
CPC .......... *G01D 5/3473* (2013.01); *G01D 5/24461* (2013.01)

(58) Field of Classification Search
CPC .......................... G01D 5/34746; G01D 5/3473
See application file for complete search history.

(56) References Cited

U.S. PATENT DOCUMENTS 9,000,356 B2 *  4/2015  Nakamura ............... 250/231.13
2008/0284421 A1  11/2008  Hatanaka et al.

FOREIGN PATENT DOCUMENTS

| JP | 3-100411 A | 4/1991 |
| JP | 4-1522 A | 1/1992 |
| JP | 4-279817 A | 10/1992 |
| JP | 5-282046 A | 10/1993 |
| JP | 6-147814 A | 5/1994 |
| JP | 7-274567 A | 10/1995 |
| JP | 9-105644 A | 4/1997 |
| JP | 2004-20198 A | 1/2004 |
| JP | 2005-345375 A | 12/2005 |
| JP | 2005345375 A | 12/2005 |

(Continued)

OTHER PUBLICATIONS

Taiwanese Office Action, mailed Jan. 7, 2014, Application No. 100139086.

(Continued)

*Primary Examiner* — Tony Ko
(74) *Attorney, Agent, or Firm* — Sughrue Mion, PLLC; Richard C. Turner

(57) ABSTRACT

The encoder includes a plurality of position-detection-signal generation systems that generates electrical signals as position detection signals having different cycles, respectively; a first computing unit that calculates first position data based on the position detection signals generated by the position-detection-signal generation systems; a second computing unit that calculates second position data based on electrical signals generated by fewer ones of the position-detection-signal generation systems than in the first computing unit; and a failure determination unit that determines whether the encoder is defective based on a comparison between the first position data and the second position data.

6 Claims, 5 Drawing Sheets

(56) References Cited

FOREIGN PATENT DOCUMENTS

| JP | 2006-153472 A | 6/2006 |
|----|---------------|--------|
| JP | 2006-194766 A | 7/2006 |
| JP | 2008-286709 A | 11/2008 |
| JP | 2010-19575 A | 1/2010 |

OTHER PUBLICATIONS

International Search Report of PCT/JP2011/067490, dated Nov. 8, 2011.

Communication dated Jul. 17, 2014, from the Intellectual Property Office of Taiwan in counterpart Taiwanese Application No. 100139086.

Kavanagh, Richard C., "Probabilistic Learning Technique for Improved Performance of Servosystems with Incremental Encoder Feedback," Proceedings of the IEEE International Symposium on Industrial Electronics, vol. 1, Jun. 1996, pp. 314-319.

Communication dated May 15, 2015, issued by the State Intellectual Property Office of the People's Republic of China in counterpart Application No. 201180072465.2.

* cited by examiner

ELECTRICAL ANGLE
RELATED TO TRACK 3a

ELECTRICAL ANGLE
RELATED TO TRACK 3b

ELECTRICAL ANGLE
RELATED TO TRACK 3c

ENCODER

CROSS REFERENCE TO RELATED APPLICATIONS

This application is a National Stage of International Application No. PCT/JP2011/067490 filed Jul. 29, 2011, the contents of all of which are incorporated herein by reference in their entirety.

FIELD

The present invention relates to an encoder that computes a position in one rotation (an intra-rotation position) of a rotating body.

BACKGROUND

As a technique for detecting a failure in an encoder, Patent Literature 1 discloses a technique that enables to compare a magnetic pole position estimated from pulse numbers of position detection signals PA and PB and a motor pole number P with actual magnetic-pole position data PU, PV, and PW and determine a failure when differences in the position are out of an acceptable range.

CITATION LIST

Patent Literature

Patent Literature 1: Japanese Patent Application Laid-open No. 9-105644

SUMMARY

Technical Problem

However, the magnetic-pole position data is not used for position detection and therefore generally has a lower resolution than the position detection signals. Accordingly, the conventional technique has a low failure detection accuracy.

A configuration in which additional position detection signals are provided for the purpose of failure detection is also conceivable. However, if such a configuration is adopted, hardware of a detection system and the like needs to be added for each of the additionally-provided position detection signals and also correction coefficients for correcting amplitudes and offsets of the additionally-provided position detection signals to ideal values need to be set, which increases demerits in manufacturing.

The present invention has been achieved in view of the above problems, and an object of the present invention is to provide an encoder that can detect a failure as accurately as possible without providing any additional position detection signals.

Solution to Problem

The present invention is directed to an encoder that achieves the object. The encoder computes an intra-rotation position of a rotating body. The encoder includes a plurality of position-detection-signal generation systems for generating position detection signals related to the rotating body having different cycles, respectively; a first computing unit for calculating a first intra-rotation position based on the position detection signals generated by the position-detection-signal generation systems, respectively; a second computing unit for calculating a second intra-rotation position based on position detection signals generated by fewer ones of the position-detection-signal generation systems than in the first computing unit; and a failure determination unit for determining whether its own encoder is defective based on a comparison between the first intra-rotation position and the second intra-rotation position.

Advantageous Effects of Invention

The encoder according to the present invention can create comparison position data for failure detection based on some of the existing position detection signals, and therefore can detect a failure as accurately as possible without providing any additional position detection signals.

DESCRIPTION OF EMBODIMENTS

Exemplary embodiments of an encoder according to the present invention will be explained below in detail with reference to the accompanying drawings. The present invention is not limited to the embodiments.

Embodiment

Figure 1:
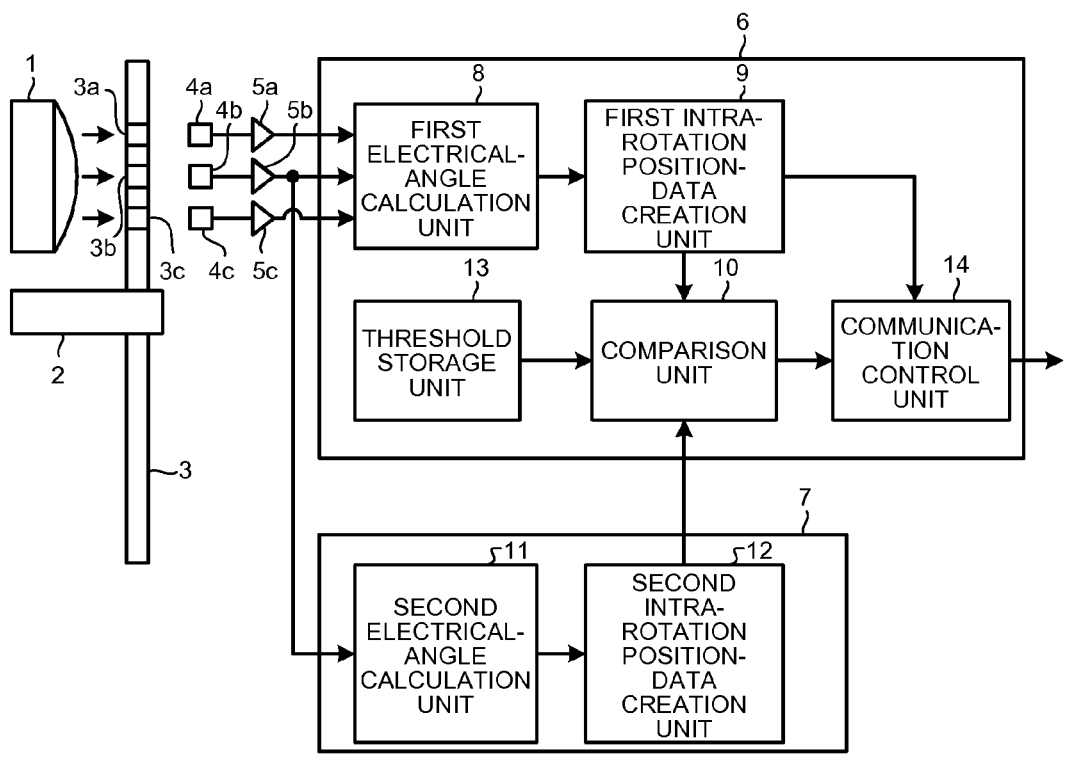
FIG. 1 is a configuration example of an encoder according to an embodiment of the present invention.

FIG. 1 depicts a configuration of an encoder according to an embodiment of the present invention. As shown in FIG. 1, the encoder according to the present embodiment includes a light source 1, a rotating shaft 2 serving as a motor rotating body, a rotating plate 3 attached to the rotating shaft 2 and having a scale on which three tracks (tracks 3a, 3b, and 3c) are formed, and photo-sensitive element units 4a to 4c. For example, a light-emitting diode (LED) is used as the light source 1 and light emitted from the light source 1 enters the tracks 3a to 3c. The light having entered the tracks 3a to 3c is modulated by the tracks 3a to 3c and enters the photo-sensitive element units 4a to 4c, respectively. The photo-sensitive element units 4a to 4c convert the incident light into electrical signals (position detection signals) through photoelectric conversion.

Figure 2:
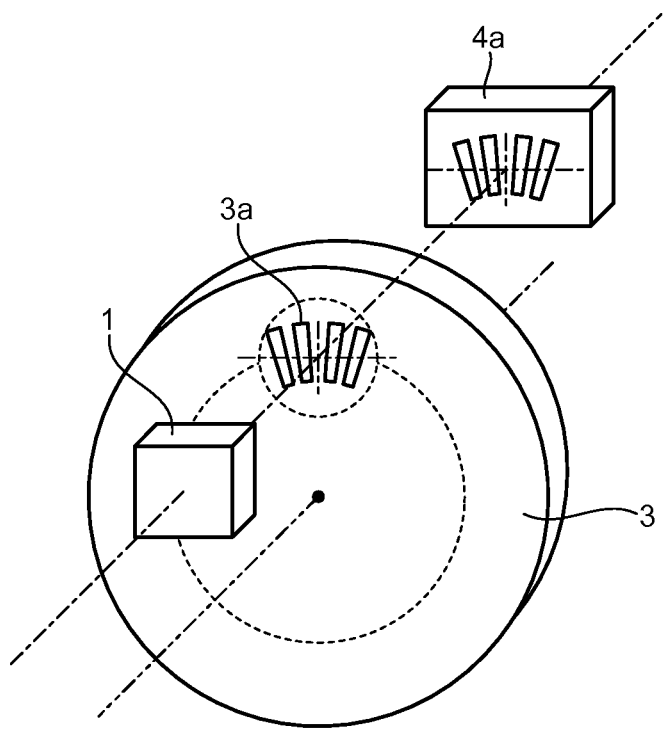
FIG. 2 is an explanatory diagram of a positional relation among a light source, tracks, and a photo-sensitive element units.

FIG. 2 is an explanatory diagram of a positional relation among the light source 1, the tracks 3a to 3c, and the photo-sensitive element units 4a to 4c. To avoid complexity, the track 3a as a representative of the tracks 3a to 3c and the photo-sensitive element unit 4a as a representative of the photo-sensitive element units 4a to 4c is explained here. As shown in FIG. 2, the track 3a and the photo-sensitive element unit 4a are arranged on an optical axis of the light source 1 so that transmitted light through the track 3a enters the photo-sensitive element unit 4a. Light transmission units that transmit light and light shielding units that shield light are provided alternatively in a rotation direction on the track 3a. The light transmission units and the light shielding units are provided in such a manner that intensity of the transmitted light changes according to a sine wave with rotation of the scale, for example, based on a PWM (Pulse Width Modulation) method. The photo-sensitive element unit 4a generates an electrical signal changing according to the sine wave from the incident light.

Figure 3:
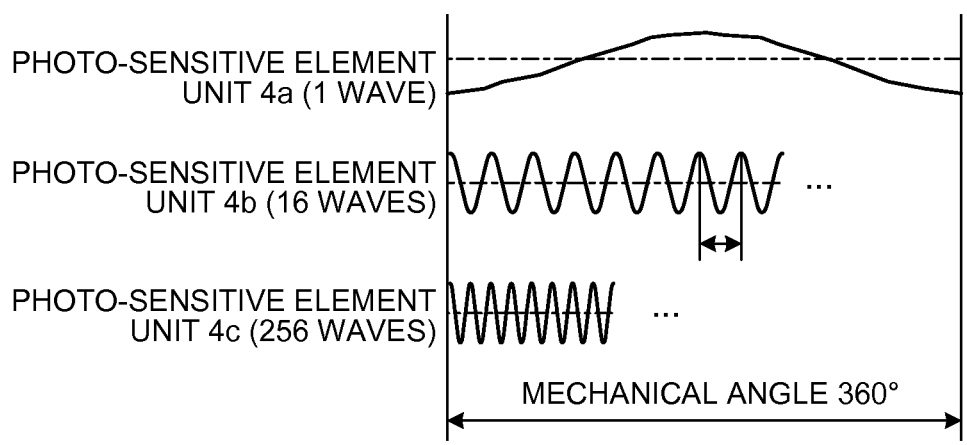
FIG. 3 is an explanatory diagram of electrical signals generated by the photo-sensitive element units based on transmitted light from the tracks.

The electrical signals generated from the tracks 3a to 3c with one rotation of the scale have different cycles. FIG. 3 is an explanatory diagram of the electrical signals generated by the photo-sensitive element units 4a to 4c based on the transmitted light from the tracks 3a to 3c, respectively. As shown in FIG. 3, the photo-sensitive element unit 4a can generate a signal with one cycle (1 wave) per rotation of the scale. The photo-sensitive element unit 4b can generate a signal with 16 cycles (16 waves) per rotation of the scale. The photo-sensitive element unit 4c generates a signal with 256 cycles (256 waves) per rotation of the scale.

That is, a position-detection-signal generation system including the light source 1, the track 3a, and the photo-sensitive element unit 4a, a position-detection-signal generation system including the light source 1, the track 3b, and the photo-sensitive element unit 4b, and a position-detection-signal generation system including the light source 1, the track 3c, and the photo-sensitive element unit 4c generate position detection signals having different cycles. In this case, the position-detection-signal generation system including the light source 1, the track 3a, and the photo-sensitive element unit 4a is defined as one system, and the position-detection-signal generation system including the light source 1, the track 3b, and the photo-sensitive element unit 4b and the position-detection-signal generation system including the light source 1, the track 3c, and the photo-sensitive element unit 4c are defined as different systems.

Referring back to FIG. 1, the electrical signals from the photo-sensitive element units 4a to 4c are amplified by amplification circuits 5a to 5c, respectively, and the amplified electrical signals are input to a microcomputer unit (MCU) 6. The MCU 6 includes a first electrical-angle calculation unit (electrical-angle calculation unit) 8, a first intra-rotation position-data creation unit (intra-rotation position creation unit) 9, a comparison unit (failure detection unit) 10, a threshold storage unit 13, and a communication control unit 14. The MCU 6 includes a CPU (Central Processing unit), a ROM (Read Only Memory), a RAM (Random Access Memory), and an I/O (Input/Output), and causes the CPU to execute a predetermined program stored in the ROM, thereby realizing functions of the functional constituent units mentioned above (the first electrical-angle calculation unit 8, the first intra-rotation position-data creation unit 9, the comparison unit 10, and the communication control unit 14). Alternatively, it is possible to provide the threshold storage unit 13 in the ROM and to previously set a threshold (explained later) in the threshold storage unit 13. It is also possible to provide the threshold storage unit 13 in the RAM and to externally input the threshold to the threshold storage unit 13 at a predetermined timing such as at the start of an operation.

The first electrical-angle calculation unit 8 calculates electrical angles of the tracks based on the electrical signals from the photo-sensitive element units 4a to 4c input through the amplification circuits 5a to 5c, respectively. In this case, the electrical angle corresponds to a signal having 360 degrees (that is, $2\pi$ radians) in one cycle of the sine wave. For example, in the case of the signal with 16 waves, one cycle of the electrical angle is generated each time the scale rotates 360/16=22.5 degrees in the mechanical angle.

Figure 4:
FIG. 4 depicts relations among mechanical angles indicated by the tracks and electrical angles generated by a first electrical-angle calculation unit.
Figure 4:
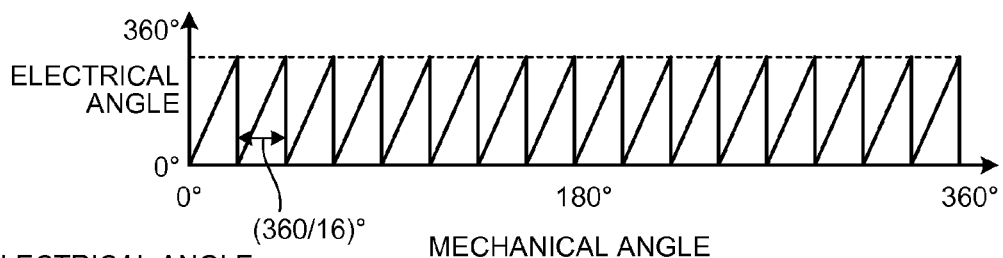
Figure 4:
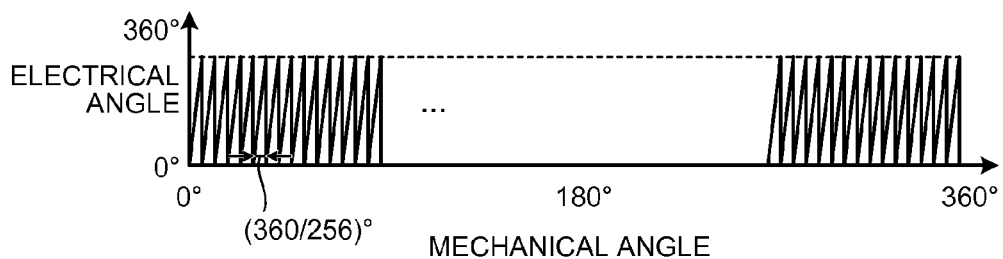

FIG. 4 depicts relations among mechanical angles indicated by the tracks 3a to 3c and electrical angles generated by the first electrical-angle calculation unit 8. As shown in FIG. 4, the electrical angle generated from the electrical signal related to the track 3a corresponds one-to-one with the mechanical angle. The electrical angle generated from the electrical signal related to the track 3b provides 16 rotations during one rotation of the mechanical angle. The electrical angle generated from the electrical signal related to the track 3c provides 256 rotations during one rotation of the mechanical angle.

To enable the first electrical-angle calculation unit 8 to accurately calculate the electrical angles, two patterns can be formed on each of the tracks 3a to 3c to generate both of the sine wave (PA) and the cosine wave (PB) and a photo-sensitive element array can be provided in each of the photo-sensitive element units 4a to 4c to generate two electrical signals from two patterns of transmitted light, respectively. Accordingly, the first electrical-angle calculation unit 8 can calculate each of the electrical angles by applying an arctan function to a value obtained by dividing the value of an electrical signal related to the sine wave by the value of an electrical signal related to the cosine wave, and the electrical angle can be more accurately calculated than in a case where the electrical angle is calculated by applying an arcsin function to the electrical signal related to the sine wave.

While a correction coefficient for correcting the amplitude and the offset to ideal values need to be set in each of the position-detection-signal generation system as mentioned above, the correction coefficient for each of the position-detection-signal generation system is assumed to be previously set in the first electrical-angle calculation unit 8. A second electrical-angle calculation unit 11 explained later calculates the electrical angle related to the track 3b and a correction coefficient related to the track 3b is also assumed to be previously set in the second electrical-angle calculation unit 11. It is needless to mention that the correction coefficient related to the track 3b can be shared by the first electrical-angle calculation unit 8 and the second electrical-angle calculation unit 11.

The first intra-rotation position-data creation unit 9 synthesizes the electrical angles related to the tracks 3a to 3c generated by the first electrical-angle calculation unit 8, thereby creating intra-rotation position data.

Figure 5:
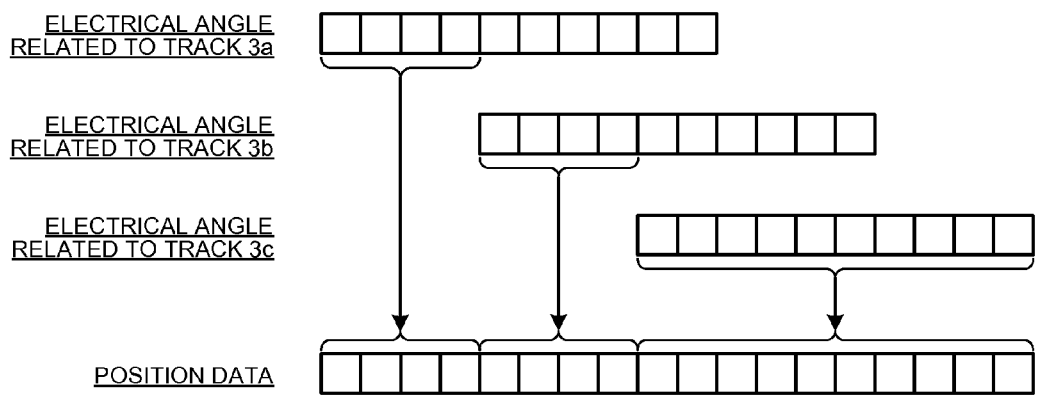
FIG. 5 is an explanatory diagram of how a first intra-rotation position-data creation unit synthesizes electrical angles.

FIG. 5 is an explanatory diagram of how the first intra-rotation position-data creation unit 9 synthesizes electrical angles. It is assumed as an example that each of the electrical angles related to the tracks 3a to 3c is described as a 10-bit resolution and that position data with an 18-bit resolution is obtained by synthesis of the electrical angles.

As shown in FIG. 5, the electrical angle related to the track 3a, the electrical angle related to the track 3b, and the electrical angle related to the track 3c have data of 10 bits in total, highest-order bits of which are an MSB (Most Significant Bit) of the position data, a fifth bit from the MSB, and a ninth bit from the MSB, respectively. The first intra-rotation position-data creation unit 9 creates the position data by obtaining an MSB to a fourth bit thereof from the electrical angle related to the track 3a, obtaining fifth to eighth bits thereof from the electrical angle related to the track 3b, and obtaining ninth to 18th bits thereof from the electrical angle related to the track 3c. The electrical angle related to each track has a higher detection accuracy in a higher-order bit than in a lower-order bit. As mentioned above, the position data that ensures a high resolution and a high detection accuracy in all bits can be obtained at the end.

Referring back to FIG. 1, the amplified electrical signal related to the track 3a branches into two and the branched electrical signals are input to the MCU 6 and an MCU 7, respectively. The electrical signal input to the MCU 6 is used by the first intra-rotation position-data creation unit 9 to create the position data, as mentioned above. The electrical signal input to the MCU 7 is used to create position data for failure detection separate from the position data mentioned above. The position data created by the first intra-rotation position-data creation unit 9 is hereinafter referred to as "first position data" and the position data created in the MCU 7 is referred to as "second position data".

The MCU 7 includes the second electrical-angle calculation unit 11 and a second intra-rotation position-data creation unit 12. The MCU 7 includes a CPU, a ROM, a RAM, and an I/O as the MCU 6 and causes the CPU to execute a predetermined program stored in the ROM, thereby realizing functions of the second electrical-angle calculation unit 11 and the second intra-rotation position-data creation unit 12.

The second electrical-angle calculation unit 11 calculates an electrical angle related to the track 3b based on the electrical signal related to the track 3b transmitted from the amplification circuit 5b. The electrical angle related to the track 3b can be the same as the electrical angle related to the track 3b calculated by the first electrical-angle calculation unit 8 or can be one described in a number of bits (14 bits, for example) different from that of the electrical angle related to the track 3b calculated by the first electrical-angle calculation unit 8.

The second intra-rotation position-data creation unit 12 generates the second position data based on the electrical angle related to the track 3b.

Figure 6:
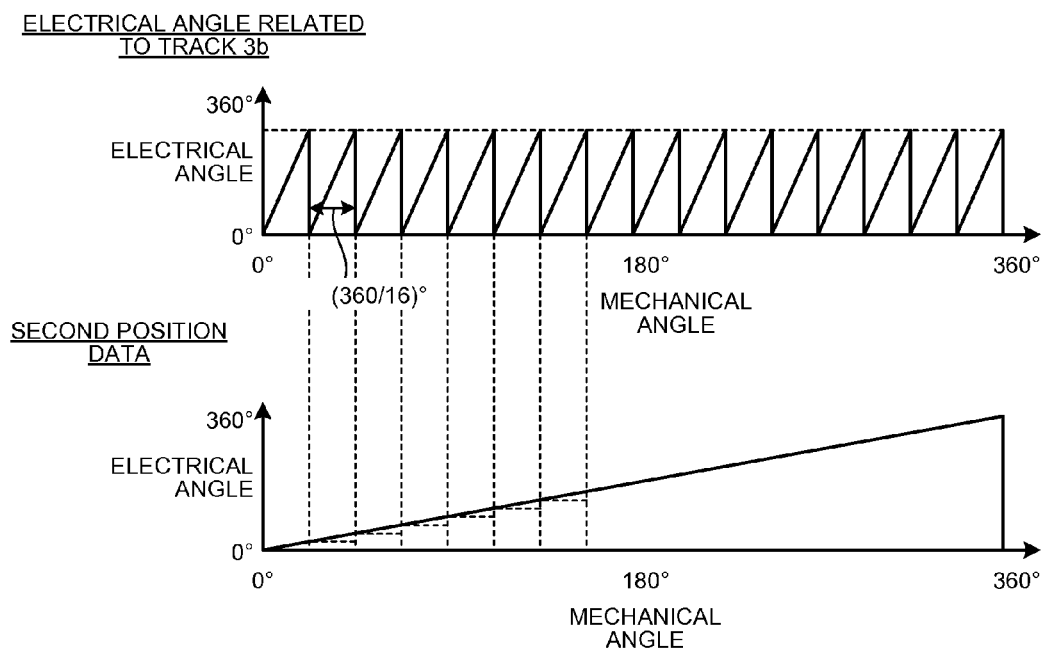
FIG. 6 depicts how a second intra-rotation position-data creation unit generates second position data.

FIG. 6 depicts how the second intra-rotation position-data creation unit 12 generates the second position data from the electrical angle related to the track 3b. As mentioned above, 16 rotations of the electrical angle related to the track 3b correspond to one rotation of the mechanical angle. As shown in FIG. 6, the second electrical-angle calculation unit 11 counts a cumulative number of rotations of the electrical angle to create a count value, and generates the second position data based on the count value and the electrical signal related to the track 3b, which is generated from the input electrical signal. That is, while the first electrical-angle calculation unit 8 obtains high-order four bits from the electrical angle related to the track 3a to generate the first position data, the second electrical-angle calculation unit 11 obtains high-order four bits of the second position data by counting the rotations of the electrical angle related to the track 3b. The second electrical-angle calculation unit 11 can reset the count value to zero or use only low-order four bits of the count value without resetting the count value to zero, when the count value reaches 16.

The comparison unit 10 included in the MCU 6 performs detection of a failure in its own encoder based on a comparison of a difference between the first and second position data with the threshold value previously stored in the threshold storage unit 13. Specifically, the comparison unit 10 issues to the communication control unit 14 a notification that no failure is detected when the difference between the first and second position data does not exceed the threshold, and issues to the communication control unit 14 a notification that a failure is detected when the difference between the first and second position data exceeds the threshold.

The communication control unit 14 generates serial communication data by attaching the notification received from the comparison unit 10 to the first position data, and transmits the generated serial communication data to an external control device. The control device having received the serial communication data can determine whether the corresponding encoder is defective by referring to the notification included in the received data.

While the second position data is for failure detection and the first position data is transmitted to the external control device in the above explanations, the first position data can be for failure detection and the second position data can be externally transmitted. Alternatively, plural pieces of position data for failure detection can be generated to detect a failure based on a comparison of the first position data with the plural pieces of position data for failure detection. When the plural pieces of position data for failure detection are generated, the comparison unit 10 can issue the notification that a failure is detected when any one of differences among the pieces of the position data for failure detection and the first position data exceeds the threshold, or can issue the notification that a failure is detected when two or more differences among the pieces of the position data for failure detection and the first position data exceed the threshold. It is also possible to configure that, when two or more pieces of the position data for failure detection coincide with each other and differences among the two or more pieces of the position data for failure detection and the first position data are equal to or higher than the threshold, the two pieces of the position data for failure detection are externally transmitted.

Figure 7:
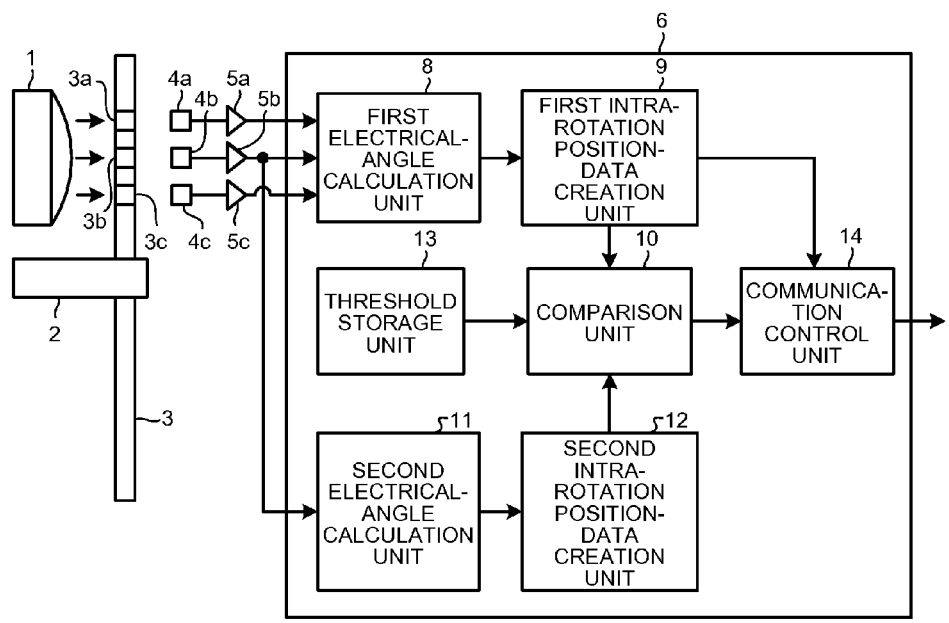
FIG. 7 is another configuration example of the encoder according to the embodiment of the present invention.

While the functional constituent units for generating the first position data (the first electrical-angle calculation unit 8 and the first intra-rotation position-data creation unit 9) and the functional constituent units for generating the second position data (the second electrical-angle calculation unit 11 and the second intra-rotation position-data creation unit 12) are realized by the different MCUs, respectively, the functional constituent units can be realized by using the same MCU 6 as shown in FIG. 7. When the functional constituent units for generating the first position data and the functional constituent units for generating the second position data are realized by the different MCUs, respectively, the reliabilities in respective pieces of the position data can be enhanced and consequently the reliability in a failure determination result can be enhanced. While the functional constituent units of the encoder according to the present embodiment are realized by using the MCUs, some or all of the functional constituent units can be realized by a hardware circuit.

While the second position data is generated based on the electrical signal related to the track 3b, the second position data can be generated based on the electrical signal related to the track 3a or 3c. When the second position data is generated based on the electrical signal related to the track 3a, the second intra-rotation position-data creation unit 12 can output the electrical angle generated by the second electrical-angle calculation unit 11 as it is as the second position data. The second position data can be generated by synthesizing any two of the electrical signals related to the tracks 3a to 3c.

While it has been explained that the tracks 3a to 3c have patterns that can obtain the electrical signals with the sine wave, respectively, the tracks 3a to 3c can be configured to have patterns that can obtain series codes represented by binary codes of 0 and 1, such as an M-sequence random code. In such a case, the first electrical-angle calculation unit 8 and the second electrical-angle calculation unit 11 can calculate the electrical angles by decoding the received electrical signals, respectively.

While the tracks having the cycles of 1 wave, 16 waves, and 256 waves are provided, the number of tracks and cycles thereof are not limited to the above explanations.

While an optical generation method using the light source 1 and the photo-sensitive element units 4a to 4c is adopted as the method of generating the position detection signal (the electrical signal), a magnetic or electromagnetic-induction generation method can be alternatively adopted. The position detection signal can be generated by generation methods different according to the tracks. For example, the magnetic generation method is resistant to disturbances related to temperatures and the optical generation method is resistant to disturbances related to magnetic fields. When the generation methods different according to the tracks are adopted, the respective merits are combined and the reliability can be further enhanced.

While the frequency of the comparison between the first and second position data performed by the comparison unit 10 has not been particularly mentioned, the comparison can be performed for each calculation cycle of the first position data (or the second position data) or the comparison can be performed once every plural calculation cycles.

While the comparison unit 10 performs the comparison regarding the first position data and the second position data as positions in one rotation, multiple rotation numbers can be compared when both of the first intra-rotation position-data creation unit 9 and the second intra-rotation position-data creation unit 12 count cumulative numbers of rotations.

While the communication control unit 14 creates the serial communication data by attaching the notification received from the comparison unit 10 to the first data, the communication control unit 14 can create the serial communication data by attaching the notification received from the comparison unit 10 to the second data or can be configured to create the serial communication data including the notification received from the comparison unit 10, without including the first or second data.

As explained above, according to the present embodiment, the encoder is configured to include the plural position-detection-signal generation systems (the light source 1, the tracks 3a to 3c, and the photo-sensitive element units 4a to 4c) generating the electrical signals as the position detection signals having different cycles, respectively, the first electrical-angle calculation unit 8 and the first intra-rotation position-data creation unit 9 that function as the first computing unit calculating the first position data based on the position detection signals generated by the position-detection-signal generation systems, respectively, the second electrical-angle calculation unit 11 and the second intra-rotation position-data creation unit 12 that function as the second computing unit calculating the second position data based on the electrical signals generated by fewer ones of the position-detection-signal generation systems than those in the first computing unit, and the comparison unit 10 functioning as a failure determination unit that determines whether the encoder is defective based on the comparison between the first position data and the second position data. Therefore, comparison position data for failure detection can be created based on the signals for position detection and also the failure detection can be performed based on the existing position detection signals without providing any additional position detection signals. Accordingly, a failure can be detected as accurately as possible without providing any additional position detection signals.

The second computing unit is configured to count the position detection signal generated by the position-detection-signal-generation system (the light source 1, the track 3b, and the photo-sensitive element unit 4b) that generates the position detection signal having plural cycles (16 cycles) with respect to one scale rotation at each cycle of the position detection signal, and to calculate the second intra-rotation position based on the electrical angle indicated by the position detection signal and the count value related to the position detection signal. Therefore, the failure detection can be performed based on a comparison of the position data created by different methods, respectively, so that the reliability in the failure detection can be enhanced.

The second computing unit can generates the second position data based on the position detection signal generated by the position-detection-signal generation system (the light source 1, the track 3a, and the photo-sensitive element unit 4a) that generates the position detection signal having one cycle with respect to one scale rotation. Accordingly, there is no need to perform counting at each cycle of the position detection signal and thus the failure detection can be performed with a simpler configuration than in the case where the second position data is calculated based on the position detection signal generated by the position-detection-signal generation system that generates the position detection signal having plural cycles with respect to one scale rotation.

The comparison unit 10 determines that its own encoder is defective when a difference between the first and second position data exceeds a preset threshold and determines that its own encoder is not defective when the difference does not exceed the threshold. Therefore, a failure can be accurately detected.

REFERENCE SIGNS LIST 1 light source
2 rotating shaft
3 rotating plate
3a to 3c track
4a to 4c photo-sensitive element unit
5a to 5c amplification circuit
6, 7 MCU
8 first electrical-angle calculation unit
9 first intra-rotation position-data creation unit
10 comparison unit
11 second electrical-angle calculation unit
12 second intra-rotation position-data creation unit
13 threshold storage unit
14 communication control unit

The invention claimed is:

1. An encoder for computing an intra-rotation position of a rotating body, the encoder comprising:
- a plurality of position-detection-signal generation systems for generating position detection signals related to the rotating body having different cycles, respectively, the position-detection signal generation systems including a position-detection-signal generation system that generates a position detection signal having one cycle with respect to one rotation of the rotating body;
- a first computing unit for calculating a first intra-rotation position based on the position detection signals generated by the position-detection-signal generation systems, respectively;
- a second computing unit for calculating a second intra-rotation position based on position detection signals generated by some of the plurality of the position-detection-signal generation systems and fewer than in the first computing unit; and a failure determination unit for determining whether its own encoder is defective based on a comparison between the first intra-rotation position and the second intra-rotation position, wherein the second computing unit calculates the second intra-rotation position based on the position detection signal generated by the position-detection-signal generation system that generates the position-detection signal having one cycle with respect to one rotation of the rotating body.

2. The encoder according to claim 1, wherein the failure determination unit determines that the encoder is defective when a difference between the first intra-rotation position and the second intra-rotation position exceeds a predetermined threshold, and determines that the encoder is not defective when the difference does not exceed the predetermined threshold.

3. The encoder according to claim 2, wherein two of the plurality of position-detection-signal generation systems uses different methods for generating the position detection signal, respectively.

4. The encoder according to claim 2, wherein the first computing unit includes:
- an electrical-angle calculation unit for calculating respective electrical angles for the position-detection-signal generation systems based on the position detection signals generated by the plurality of the position-detection-signal generation systems, respectively; and
- an intra-rotation position creation unit for calculating the first intra-rotation position by synthesizing the respective electrical angles for the plurality of the position-detection-signal generation systems calculated by the electrical-angle calculation unit.

5. The encoder according to claim 2, wherein the predetermined threshold is recoded in a nonvolatile memory.

6. The encoder according to claim 2, wherein the predetermined threshold is externally input.

* * * * *